United States Patent [19]
Hornbeck

[11] Patent Number: 4,710,732
[45] Date of Patent: Dec. 1, 1987

[54] SPATIAL LIGHT MODULATOR AND METHOD

[75] Inventor: Larry J. Hornbeck, Van Alstyne, Tex.

[73] Assignee: Texas Instruments Incorporated, Dallas, Tex.

[21] Appl. No.: 635,966

[22] Filed: Jul. 31, 1984

[51] Int. Cl.$^4$ .......................... G02F 1/27; B44C 1/22; H04N 5/74
[52] U.S. Cl. ................... 332/7.51; 350/269; 350/360; 358/231; 313/465
[58] Field of Search .............. 350/360, 356, 355, 385, 350/269, 109; 357/30, 51; 358/231, 233; 29/571; 156/643, 644, 646; 204/192 E; 332/7.51; 313/486, 465

[56] References Cited

U.S. PATENT DOCUMENTS

| | | | |
|---|---|---|---|
| 1,984,683 | 12/1934 | Jenkins | 350/360 |
| 3,600,798 | 8/1971 | Lee | 358/231 |
| 3,746,911 | 7/1973 | Nathanson et al. | 313/465 |
| 3,886,310 | 5/1975 | Guldberg | 358/231 |
| 3,896,338 | 7/1975 | Nathanson et al. | 358/231 |
| 4,229,732 | 10/1980 | Hartstern et al. | 358/233 |
| 4,356,730 | 11/1982 | Cade | 358/231 |
| 4,441,791 | 4/1984 | Hornbeck | 350/360 |
| 4,492,435 | 1/1985 | Barton et al. | 350/360 |
| 4,566,935 | 1/1986 | Hornbeck | 350/356 |
| 4,571,603 | 2/1986 | Hornbeck et al. | 340/183 |
| 4,592,628 | 6/1986 | Altman et al. | 350/483 |
| 4,638,309 | 1/1987 | Ott | 350/360 |

OTHER PUBLICATIONS

Wohl, R. J., "Fourfold Increased Resolution on Color DPDT", 9/76, IBM Tech. Disc. Bull., vol. 19, #4, pp. 1419–1420.

Peterson, K. E., "Micromechanical Light Deflector Array", 6/77, IBM Tech. Disc. Bull., vol. 20, #1, pp. 355–356.

Thomas et al., "The Mirror-Matrix... Displays", 1975, Proc. S.I.D., vol. 16, #3, pp. 184–194.

Pape et al., "Characteristics... Information Processing", 12/83, Optical Eng., vol. 22, #6, pp. 675–681; SPIE paper of 1/20/83.

Hornbeck, "128—128 Deformable Mirror Device", 5/83, pp. 539–545, IEEE Trans. Elect. Devices, vol. ED-30, #5 (abst).

IBID, but at Conf. Record of 10/21/82, at Intern. Display Reserach Conf., pp. 76–79, N. S. (abst).

Hornbeck et al., "Deformable Mirror Proj. Display", 5/1/80, pp. 228–229, SID Intern. Symp., San Diego, Calif. (abst).

*Primary Examiner*—Nelson Moskowitz
*Attorney, Agent, or Firm*—Carlton H. Hoel; Leo N. Heiting; Melvin Sharp

[57] ABSTRACT

Spatial light modulators with deflectable metal flaps hinged to conducting posts on a substrate are disclosed. The metal flaps and conducting post may be a single piece, and connected to addressing circuitry in the substrate. Also, plasma etching to fabricate the flaps without breakage is disclosed.

8 Claims, 35 Drawing Figures

SPATIAL LIGHT MODULATOR AND METHOD

CROSS-REFERENCE TO RELATED APPLICATIONS

The following copending patent applications disclose related subject matter: Ser. Nos. 636,180 filed July 31, 1984; 646,399 filed Aug. 31, 1984 (now U.S. Pat. No. 4,596,992); 659,387 filed Oct. 10, 1984; and 635,967 filed July 31, 1984 (now U.S. Pat. No. 4,566,935). All of these cross-referenced applications are assigned to the assignee of the present application.

BACKGROUND OF THE INVENTION

The present invention relates to spatial light modulators (light valves), and, more particularly, to spatial light modulators with deflectable beams electronically addressed.

Spatial light modulators (SLM) are transducers that modulate incident light in a spatial pattern corresponding to an electrical or optical input. The incident light may be modulated in its phase, intensity, polarization, or direction, and the light modulation may achieved by a variety of materials exhibiting various electrooptic or magnetoopotic effects and by materials that modulate light by surface deformation. SLMs have found numerous applications in the areas of optical information processing, projection displays, and electrostatic printing. See references cited in L. Hornbeck, 128×128 Deformable Mirror Device, 30 IEEE Tran.Elec.Dev. 539 (1983).

A well known SLM used for large bright electronic displays is the Eidophor, a system which uses an electrostatically dimpled oil film as the active optical element. See, E. Baumann, The Fischer large-screen projection system (Eidophor), 20 J.SMPTE 351 (1953). In this system a continuous oil film is scanned in raster fashion with an electron beam that is modulated so as to create a spatially periodic distribution of deposited charge within each resolvable pixel area on the oil film. This charge distribution results in the creation of a phase grating within each pixel by virtue of the electrostatic attraction between the oil film surface and the suporting substrate, which is maintained at constant potential. This attractive force causes the surface of the film to deform by an amount proportional to the qunatity of deposited charge. The modulated oil film is illuminated with spatially coherent light from a xenon arc lamp. Light incident to modulated pixels on the oil film is diffracted by the local phase gratings into a discrete set of regularly spaced orders which are made to fall on a schlieren stop consisting of a periodic array of alternating clear and opaque bars by part of the optical system. The spacing of the schlieren stop bars is chosen to match the spacing of the diffracted signal orders at the stop plane so that high optical throughput efficiency is achieved. Light that is incident to unmodulated regions of the light valve is blocked from reaching the projection lens by the opaque bars of the schlieren stop. Images formed of unmodulated areas on the light valve by the schlieren imaging system on the projection screen are therefore dark, while the phase perturbations introduced by the molulated electron beam are converted into bright spots of light at the screen by the schlieren projector. In spite of numerous technical difficulties associated with oil polymerization by electron bombardment and organic vapor contamination of the cathode, this type of oil-film system has been successfully developed to the point that it is the almost universally used system for a total light requirement of thousands of lumens at the screen. However, such systems are expensive, bulky, and have short-lived components.

A number of non-oil-film SLMs have also been developed and include deflectable element types, rotation of plane of polarization types, and light scattering types. These SLM types employ various effects such as deformation of reflective layers of metal, elastomer, or elastomer-photoconductor, and polarization and scattering of ferroelectrics, PLZT ceramics, and liquid crystals. For example, R. Sprague et al, Linear total internal reflection spatial light modulator for laser printing, 299 Proc. SPIE 68 (1981) and W. Turner and R. Sprague, Integrated total internal reflection (TIR) spatial light modulator for laser printing, 299 Proc. SPIE 76 (1982) and U.S. Pat. No. 4,380,373 describe a system for non-impact printing on a photosensitive medium in which laser light is formed into a line of illumination and passed through a linear array of light modulators and then imaged onto the photosensitive medium. The array is implemented as a total internal reflection spatial light modulator with the electrodes and drive electronics fabricated on an integrated drive element which is placed against the total reflection surface of an electrooptic crystal such as lithium niobate. The localized change in index of refraction produced by the fringing field between each two electrodes is read out with schlieren readout optics which image the TIR interface onto the photosensitive medium. This is a one dimensional image, and the photosensitive medium is rotated on a drum beneath the image of the linear array to generate the two dimensional image (e.g., a page of text) for printing applications. However, the SLM (light valve) is highly susceptible to fabrication problems due to its hybrid nature. The fringing field strength, and hence the amount of light diffracted from modulated pixels, is sensitive to changes in the air gap thickness between the address electrodes and the electrooptic crystal surface of less than one tenth micron. Thus, even very small particles trapped between the crystal and electrode structure could cause illumination nonuniformity problems at the photosensitive medium. The system optical response for pixels located at the boundary between modulated and unmodulated areas of the light valve is also significantly lower than the response for pixels near the middle of a modulated region due to the nature of the addressing technique. A commercially available printer based on this technology has not been introduced to date.

M. Little et al., CCD-Addressed Liquid Crystal Light Valve, Proc. SID Symp. 250 (April 1982) describes a SLM with a CCD area array on the front side of a silicon chip and a liquid crystal array on the backside of the chip. Charge is input into the CCD until a complete frame of analog charge data has been loaded; the charge is then dumped to the backside of the chip where it modulates the liquid crystal. This device suffers from severe fixed pattern noise as well as resolution degradation due to the charge spreading from the front-to-back transfer.

Another SLM type which may be fabricated in both one and two dimensional arrays is the deformable mirror. Deformable mirrors may be subdivided into three classes: elastomers, membranes, and cantilever beams. In the elastomer approach a metallized elastomer is addressed by a spatially varying voltage that produces surface deformation through compression of the elastomer. Because of the address voltage requirements in the order of one or two hundred volts, the elastomer is not a good candidate for integration with a high-density silicon address circuit. See, generally, A. Lakatos and R. Bergen, TV projection display using an amorphous-Se-type RUTICON light valve, 24 IEEE Tran. Elec.-Dev.930 (1977).

Membrane deformable mirrors come in a variety of types. One type is essentially a substitute for the oil film of the Eidophor system discussed above. In this system a thin reflective membrane is mounted to the faceplate of a cathode ray tube (CRT) by means of a support grid structure. Addressing is by a raster scanned electron beam as with the Eidophor. The charge deposited on the glass faceplate of the CRT by the electron beam electrostatically attracts the membrane which is held at a constant voltage. This attractive force causes the membrane to sag into the well formed by the grid structure, thereby forming a miniature spherical mirror at each modulated pixel location. The light diffracted from this type of modulated pixel is concentrated into a relatively narrow cone that is rotationally symmetric about the specularly reflected beam. This type of light valve is thus used with a schlieren stop that consists of a single central obsucration positioned and sized so as to block the image of the light source that is formed by the optical system after specular reflection from unmodulated areas of the light valve. Modulated pixels give rise to a circular patch of light at the schlieren stop plane that is larger than the central obscuration, but centered on it. The stop efficiency, or fraction of the modulated pixel energy that clears the schlieren stop, is generally somewhat lower for projectors based on deformable membranes than it is for the oil film Eidophor projector. Further, such membrane deformable mirror systems have at least two major problems. High voltages are required for addressing the relatively stiff reflective membrane, and slight misalignments between the eletron beam raster and the pixel support grid structure lead to addressing problems. Such misalignments would cause image blurring and nonuniformity in display brightness.

Another type of membrane deformable mirror is described in L. Hornbeck, 30 IEEE Tran.Elec.Dev.539 (1983) and U.S. Pat. No. 4,441,791 and is a hybrid integrated circuit consisting of an array of metallized polymer mirrors bonded to a silicon address circuit. The underlying analog address circuit, which is separated by an air gap from the mirror elements, causes the array of mirrors to be displaced in selected pixels by electrostatic attraction. The resultant two-dimensional displacement pattern yields a corresponding phase modulation pattern for reflected light. This pattern may be converted into analog intensity variations by schlieren projection techniques or used as the input transducer for an optical information processor. However, the membrane deformable mirror has manufacturability problems due to the susceptibility to defects that result when even small, micron sized paticles are trapped between the membrane and the underlyiong support structure. The membrane would form a tent voer these trapped particles, and the lateral extent of such tents is much larger than the size of the particle itself, and these tents would in turn be imaged as bright spots by a schlieren imaging system.

A cantilever beam deformable mirror is a micromechanical array of deformable cantilever beams which can be electrostatically and individually deformed by some address means to modulate incident light in a linear or areal pattern. Used in conjunction with the proper projection optics, a cantilever beam deformable mirror can be employed for displays, optical information processing, and electrophotographic printing. An early version with metal cantilever beams fabricated on glass by vacuum evaporation appears in U.S. Pat. No. 3,600,798. This device has fabrication problems which include the alignment of the front and back glass substrates arising from the device's nonintegrated architecture.

A cantilever beam deformable mirror device is described in R. Thomas et al, The Mirror-Matrix Tube: A Novel Light Valve for Projection Displays, 22 IEEE Tran.Elec.Dev. 765 (1975) and U.S. Pat. Nos. 3,886,310 and 3,896,338. This device is fabricated as follows: a thermal silicon dioxide layer is grown on a silicon on sapphire substrate; the oxide is patterned in a cloverleaf array of four cantilever beams joined in the middle. The silicon is isotropically wet etched until the oxide is undercut, leaving within each pixel four oxide cantilever beams supported by a central silicon support post. The cloverleaf array is then metallized with aluminum for reflectivity. The aluminum which is deposited on the sapphire substrate forms a reference grid electrode which is held at a DC bias. The device is addressed by a scanning electron beam which deposits a charge pattern on the cloverleaf beams causing the beams to be deformed by electrostatic attraction towards the reference grid. Erasure is achieved by negatively biasing a closely spaced external grid and flooding the device with low-energy electrons. A schlieren projector is used to convert the beam deformation into brightness variations at the projection screen. A significant feature of this device is the cloverleaf geometry which leads to beam deflection in a direction rotated forty-five degrees from the openings between the beams; this permits use of a simple cross shaped schlieren stop to block out the fixed diffraction background signal without attenuating the modulated diffraction signal. The device was fabricated with a pixel density of five hundred pixels per inch with beams deflectable up to four degrees. The optics employed a 150 watt xenon arc lamp, reflective schlieren optics and a 2.5 by 3.5 foot screen with a gain of five. Four hundred TV lines of resolution were demonstrated with a screen brightness of thirty-five foot-lumens, a contrast ratio of fifteen to one, and a beam diffraction efficiency of forty-eight percent. Write times of less than 1/30 second were achieved and erase times were as short as 1/10 of the write time. However, the device has problems, including degradation of resolution from scanning errors, poor manufacturing yield, and no advantage over conventional projection cathode ray tubes. That is, the scan-to-scan positioning accuracy is not high enough to reproducibly write on individual pixels. The resulting loss of resolution forces at least a four fold increase in the number of pixels required to maintain the same resolution compared to comparably written phosphor. Also, the device yield is limited by the lack of an etch stop for the cloverleaf support post, the wet etching of the beams leading to beam breakage, and the need to evaporate normally tensile aluminum in a state of zero stress on the oxide beams. Further, the device offers no apparent cost or performance advantage over conventional projection CRTs.

Cantilever beam deformable mirrors integrated on silicon with addressing circuitry, thus eliminating the electron beam addressing with its high voltage circuitry and vacuum envelopes of the previously described cantilever device, appear in K. Peterson, Micromechanical light modulator array fabricated on silicon, 31 Appl.-Phys.Lett. 521 (1977) and U.S. Pat. No. 4,229,732. The first of these references describes a 16 by 1 array of diving board-shaped cantilever beams fabricated as follows: an epitaxial layer of <100>-oriented silicon (either p or n) of thickness of about 12 microns is grown on a p+ substrate (or buried layer); the epilayer is oxidized to a thickness of about 0.5 micron and covered with a Cr-Au film of thickness about 500 A. The Cr-Au is etched away to form contact pads and address lines and to define the diving board metallization. The oxide is etched away in a comb pattern around the metallization in a second masking step. Finally, the silicon itself is etched in a solution of ethylenediamine and pyrocatechol at 120 degrees C. If the proper orientation of the mask with respect to the crystalline axes is maintained, the metal-coated oxide diving boards will be undercut by the etch and freed from the silicon. Since the etch is anisotropic, further lateral etching will be stopped by the <111> planes defining the rectangular envelope of the comb pattern. In addition, the etchant is inhibited by p+ material, so the depth of the well beneath the diving boards is defined by the thickness of the epilayer. When a dc voltage is applied between the substrate and the diving board metallization, the thin oxide diving board will be electrostatically deflected downward into the etched well. Diving boards of length 106 microns and width 25 microns showed a threshold voltage of about 66 volts.

The second reference (U.S. Pat. No. 4,229,732) describes devices fabricated in a manner similar to the diving board device (a buried p+ layer as an etch stop for forming the wells underneath metallized silicon dioxide cantilever beams) but has a different architecture; namely, the cantilever beams are in the shape of square flaps hinged at one corner, the flaps form a two dimensional array instead of the one dimensional row of diving boards, and the wells underneath the flaps are not connected so that addressing lines for the flaps may be formed on the top surface of the silicon between the rows and columns of flaps. Of course, the corner hinging of the flaps derives from the cloverleaf architecture of U.S. Pat. Nos. 3,886,310 and 3,896,338, but the full cloverleaf architecture could not be used because this would preclude the surface addressing lines since cloverleaf flaps are hinged to a central post isolated from the silicon surface. Further, these devices have problems including poor resolution and low efficiency due to density limitations and the small fractional active area, low manufacturing yield, degradation of contrast ratio due to diffraction effects from the address circuitry, and residual image due to the charging effects of the oxide flap. More particularly, the addressing circuitry is squeezed around the active area (flaps) because no option exists for placing the address circuitry under the active area due to the wells being formed by etching away the epilayer down to the p+ etch stop. Thus the active area is reduced substantially together with the diffraction efficiency. This means more lamp power is required for the same screen brightness. Because the address circuitry requires additional area, the pixel size is increased far beyond the flap area with a resulting decrease in achievable resolution. The wet etching required to form the wells leads to low electrical and mechanical yield; indeed, wet cleanups, such as after dicing into chips, destroy flaps and diving boards because during the spin-rinse/dry cycle the water trapped under the beam breaks the beam as it is spun from the surface. If the water is instead evaporated from the surface it leaves behind surface residues which can increase surface leakage currents contributing to erratic device operation. Also, the addressing circuitry being on the silicon surface is exposed to the incident light to be modulated and creates unwanted diffraction effects from the transistor gates plus lowers the contrast ratio. In addition, light leakage into the address structure produces photogenerated charge and reduces storage time. Lastly, the oxide/metal flap has the insulating side facing the well and will charge up due to the intense electric fields which exist across the well; this produces a residual ("burn-in") image. The AC drive required to eliminate this residual image problem cannot be supplied by the NMOS drive circuitry described. Further, if the flap is deflected past the maximum stable deflection, then it will collapse and stick to the bottom of the well. Thus, voltages over the collapse voltage must be absolutely avoided.

A variation of the cantilever beam approach appears in K. Peterson, Silicon Torsional Scanning Mirror, 24 IBM J.Res.Devp. 631 (1980) and M. Cadman et al, New Micromechanical Display Using Thin Metallic Films, 4 IEEE Elec.Dev.Lett. 3 (1983). This approach forms metallic flaps which are connected to the surrounding reflective surface at two opposed corners and operate by twisting the flaps along the axes formed by the connections. The flaps are not formed monolithically with the underlying addressing substrate, but are glued to it in a manner analogous to the deformable membrane devices mentioned above.

The cantilever beam references discussed above all suggest that schlieren projection optical systems be used with the cantilever beam devices. But such systems have limitations in terms of attainable optical performance. First, the aperture diameter of the imaging lens must be larger than is necessary to pass the signal energy alone. Hence the speed of the lens must be relatively high (or, equivalently, its f-number must be relatively low) to pass all the signal energy around the central schlieren stop obscuration. In addition, the signal passes through the outer portion of the lens pupil in this imaging configuration. Rays of light emanating from any given point on the SLM and passing through the outermost areas of an imager lens pupil are the most difficult ones to bring to a well-corrected focus during the optical design of any imaging lens. When the outer rays are brought under good control, the rays passing through the center of the imager lens are automatically well-corrected. Hence, a greater level of optical design complexity is required of the imaging lens. Second, the field angle over which the imaging lens can form well-corrected images of off-axis pixels on a cantilever beam SLM is also restricted. Any lens design task involves a compromise between the speed of the lens and the field angle it can cover with good image quality. Fast lenses tend to work over small fields, while wide angle lenses tend to be relatively slow. Since the schlieren imager must be well-corrected over its entire aperture, and since this aperture is larger in diameter than is required to pass the image forming light, the field angle that can be covered by the lens is smaller than it could be if a different imaging configuration could be devised in which the signal was passed through the center of an unobscured, smaller diameter lens. Lastly, for an imager lens having a given finite speed, the use of the schlieren stop configuration also limits the size of the light source that can be utilized. This in turn limits the irradiance level that can be delivered to a projection screen or a photoreceptor at the image of a deflected pixel. This irradiance level, or the delivered power per unit area, depends on the product of the radiance of the light source, the transmittance of the optical system, and the solid angle of the cone of image forming rays of light. The source radiance is determined only by the particular lamp that is used. The optics transmittance depends on the stop efficiency for the particular SLM/schlieren stop configuration and surface transmission losses. But the solid angle of the image forming cone of light is directly proportional to the area of the imager lens pupil that is filled with signal energy. The use of a schlieren stop that obscures the central area of the imager lens pupil limits the usable pupil area and thus the image plane irradiance level that can be obtained for a lens of a given speed and a source of a given radiance; this is in addition to the fundamental irradiance limitation that the maximum usable cone of light has an opening angle equal to the beam deflection angle.

Thus the known cantilever beam SLMs have problems including addressing circuitry limiting the fractional active area of the pixels, processing steps giving low yields, sensitivity to film stress in the beams, beam insulator charging effects, lack of overvoltage protection against beam collapse, performance not compatible with low cost optics design, and low contrast ratio due to non planarized addressing circuitry on the surface.

SUMMARY OF THE INVENTION

The present invention provides spatial light modulators with pixels including reflective deflectable beams electrically connected to supporting posts on a substrate with addressing of the beams through the supporting posts. Thus the pixels may be tightly packed with the addressing circuitry off of the reflective surface which solves problems of packing density and diffraction in the known deflectable beam spatial light modulators. Further, preferred ebodiments provide architectures which can be fabricated by plasma etching to free the beams from a processing spacer as an essentially last step; this solves the problem of beam breakage during processing with the architectures of the known deflectable beams.

DESCRIPTION OF THE PREFERRED EMBODIMENTS

The inventive deflectable beam spatial light modulators (SML) are typically a linear or area array of pixels formed monolithically in a silicon chip. Each pixel is addressable and contains a deflectable reflecting beam; the SLM operates by reflecting incident light from these beams, modulation of the incident light being performed by varying the deflection of the beams and thus the angle of reflection. The SLM chips are fabricated by processing silicon wafers, dicing the wafers into chips, followed by processing of the individual chips. The chips will vary in size depending upon the application; for example, a 2400 by 1 linear array of pixels (which could be a component of a 300 dots per inch nonimpact printer) may be fabricated on a chip about 1300 mils by 250 mils with pixels about 12 microns square.

The following descriptions are primarily of the individual pixels for an SLM, and all of the drawings are schematic for clarity of explanation.

Figure 1A:
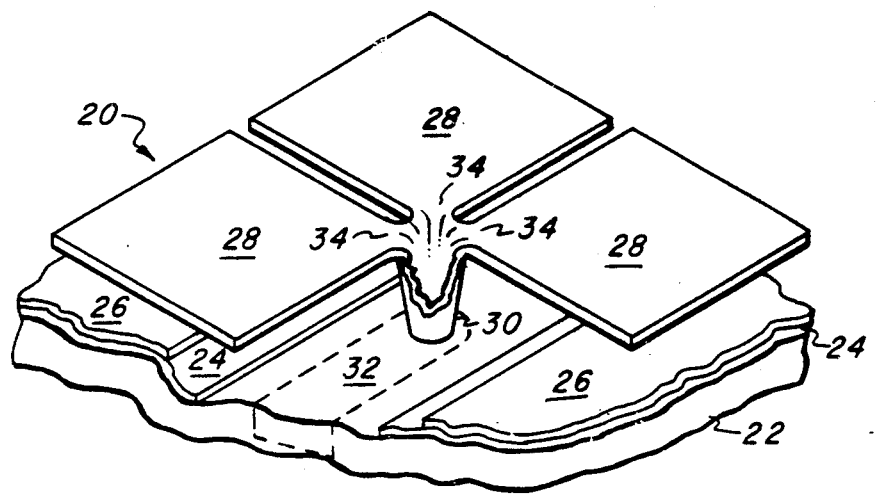
FIG. 1 shows a first preferred embodiment pixel in schematic cutaway perspective, cross sectional, and plan views.
Figure 1B:
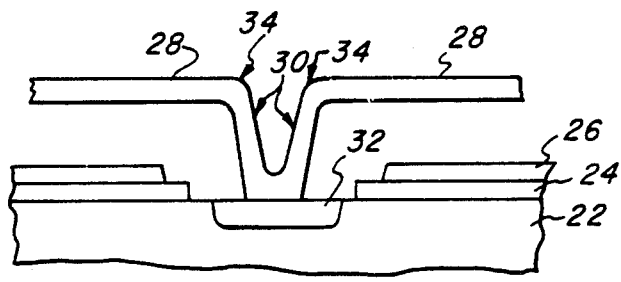
Figure 1C:
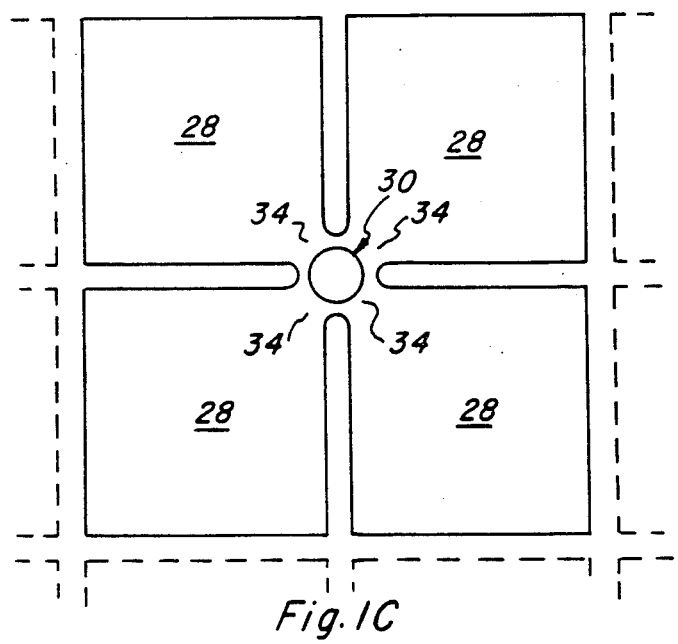

A first preferred embodiment single pixel for a deflectable beam SLM is shown in cutaway perspective view in FIG. 1A, cross sectional view in FIG. 1B, and plan view in FIG. 1C. The pixel, generally denoted 20 and basically a cloverleaf of four flaps hinged to a central post over a substrate, includes substrate 22, insulating layer 24, field plate 26, flaps 28, support post 30, and flap addressing diffusion 32. Support post 30 is cylindrical and symmetrically supports four flaps 28 by corner hinges 34; see FIG. 1C. Typical dimensions for pixel 20 would be as follows: flaps 28 are squares with sides 12 to 25 microns long; the gaps between the flaps are about 1 micron wide; support post 30 is 1 to 2 microns in diameter and 1 to 2.5 microns high; flaps 28 are about 0.12 micron (1,200 Å) thick; insulating layer 24 is about 0.15 micron (1,500 Å) thick; and field plate 26 is about 0.1 micron (1,000 A) thick.

Substrate 22 is <100> oriented silicon with resistivity 5 to 10 ohms-cm. Flaps 28 and support post 30 are a single piece of aluminum alloyed with four percent copper; this alloy minimizes the growth of aluminum hillocks as stress relief during the deposition and processing of the metal but still has relatively high reflectivity. Insulating layer 24 is silicon dioxide, and field plate 26 is aluminum.

Figure 2:
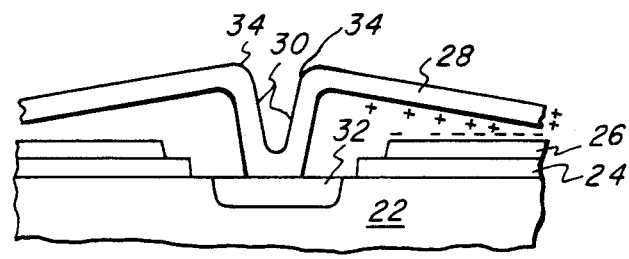
FIG. 2 is a cross sectional view of the pixel of FIG. 1 illustrating the deflection of the beams.
Figure 3:
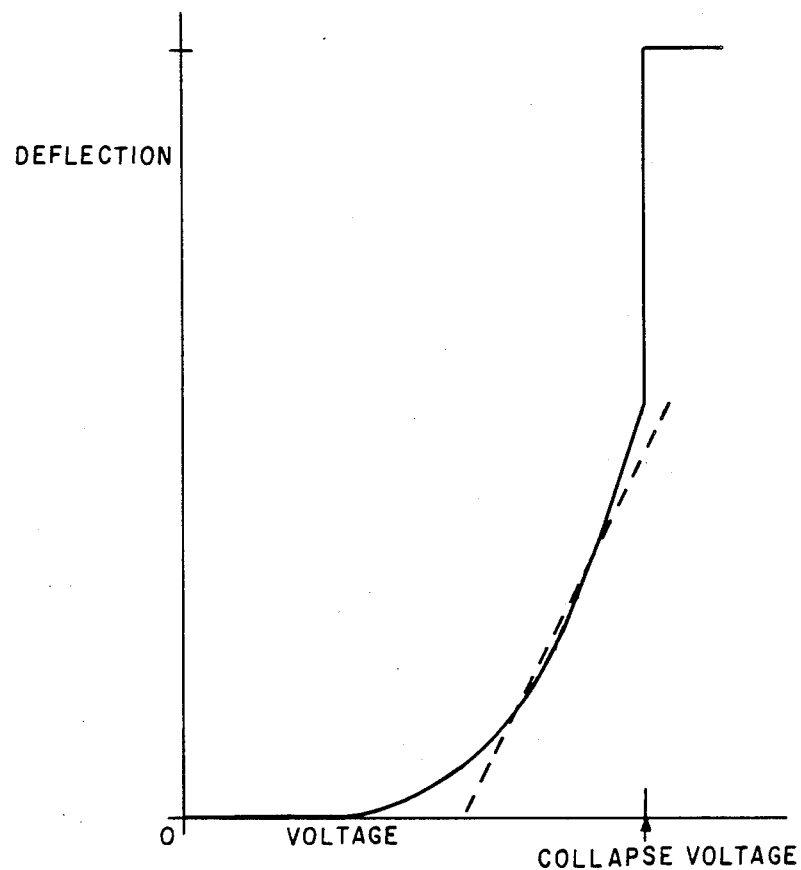
FIG. 3 is a response curve for the pixel of FIG. 1.
Figure 4A:
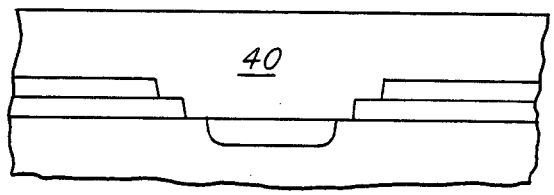
FIG. 4 illustrates the steps in fabrication of the pixel of FIG. 1.
Figure 4B:
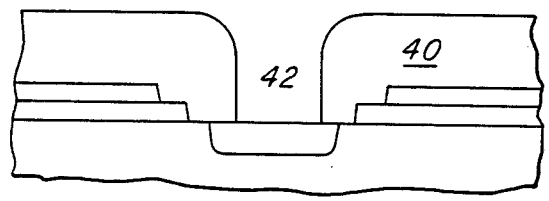
Figure 4C:
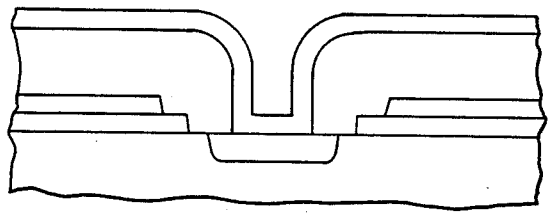
Figure 4D:
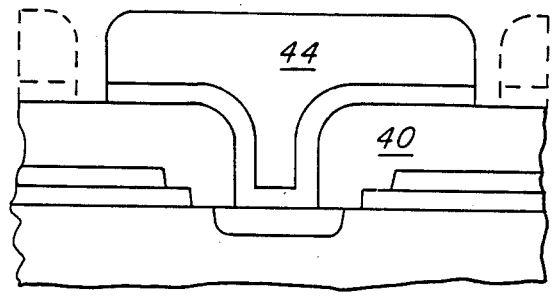
Figure 4E:
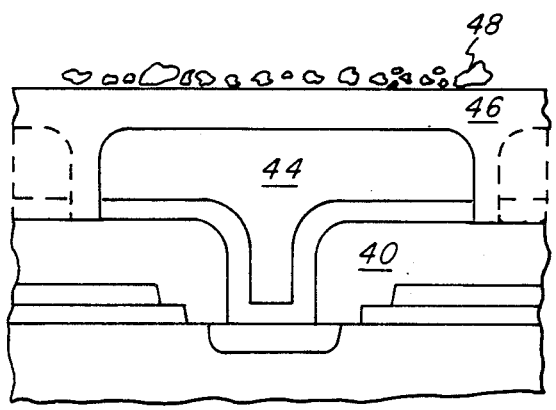
Figure 4F:
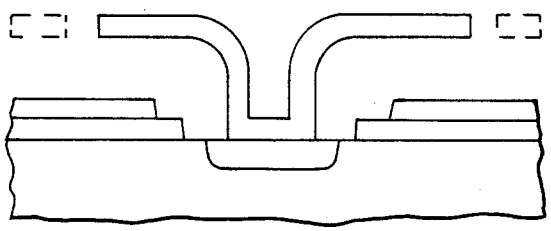

Pixel 20 is operated by applying a voltage between flaps 28 and field plate 26; flaps 28 and field plate 26 form the two plates of an air gap capacitor and the opposite charges induced on the two plates by the voltage exert an electrostatic force attracting the flaps 28 to field plate 26. This force bends flaps 28 at hinges 34 and deflects them towards substrate 22; FIG. 2 shows an exaggerated view of this deflection together with an indication of the charges concentrated at the regions of smallest gap. For voltages in the range of 20 to 25 volts, the deflection is in the range of 1 to 2 degrees (approximately 0.5 micron vertical movement by the corners of flaps 28 farthest from hinges 34 for a 20 micron flap size with 1 degree of deflection). Note that the deflection is a highly nonlinear function of the voltage because the restoring torque generated by the bending of hinges 34 is approximately a linear function of the deflection but the electrostatic force exerts a torque which increases approximately as the logarithm of the distance between field plate 26 and the corners of flaps 28 farthest from hinges 34, that is, the corners closest to field plate 26. FIG. 3 illustrates the dependence of the deflection on the applied voltage; the voltage at which flaps 28 become unstable and bend all the way to touch field plate 26 is called the collpase voltage. For voltages somewhat less than the collapse voltage the deflection is approximately a linear function of voltage (see the dotted line in FIG. 3) and this is the analog operating region for pixel 20.

The steps for fabrication of pixel 20 are illustrated in FIG. 4 and include the following. (1) Start with a <100> oriented silicon substrate of resistivity 5 to 10 ohms-cm (typically the substrate will be in the form of a three inch diameter circular wafer); (2) form diffusion line 32, insulating layer 24, and field plate 26 with standard implantation, deposition and photolithographic techniques; (3) spin on a planarizing spacer 40 such as positive photoresist to a thickness of 1 to 2.5 microns (this will be the distance from flaps 28 to field plate 26) and pattern it to open up holes 42; (4) sputter deposit four percent copper aluminum alloy on the spacer to a thickness of 0.12 micron; (5) apply a photoresist 44 and photolithographically pattern it to define the gaps between and the perimeters of flaps 28; (6) plasma etch the exposed aluminum (for example, in a mixture of chlorine, boron trichloride, and silicon tetrachloride) to from the gaps between and the perimeters of flaps 28; (7) spin on a layer 46 of polymethyl methacrylate (PMMA) to act as a protection layer during subsequent steps; (8) dice the substrate into chips (each chip will become an SLM); (9) dissolve the PMMA by spraying with chlorobenzene and immediately centrifuge to remove the dicing debris 48, note that the positive photoresist will not dissolve in the chlorobenzene; (10) plasma etch the chips (in oxygen) to remove the positive photoresist, including spacer 40, and thereby form the pixels.

The width and length of the gap between the adjacent flaps 28 on support post 30 (together with the diameter of post 30 and the thickness of the metal forming flaps 28 and post 30) determine the stiffness of hinges 34. Thus the sensitivity of pixel 20 can be adjusted. Also, pixels 20 can be tightly packed in an array, as indicated by the dotted lines in FIGS. 1C and 4, because the field plate is a common voltage for all pixels and no isolation is required.

Figure 5:
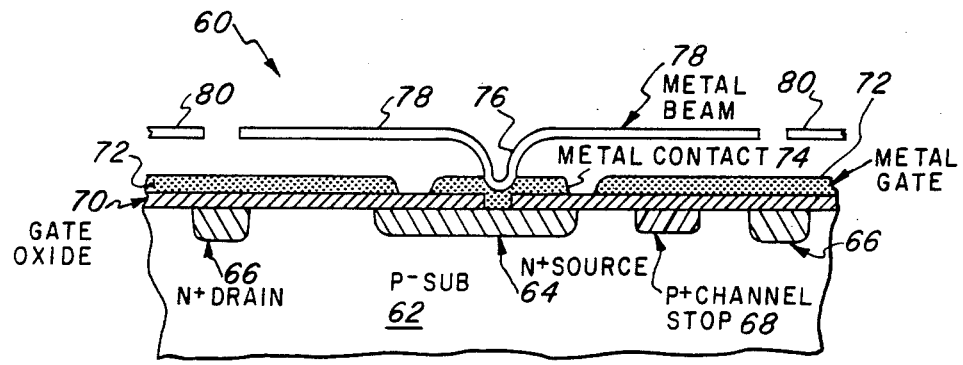
FIG. 5 is a cross sectional view of a variation of the pixel of FIG. 1.
Figure 6A:
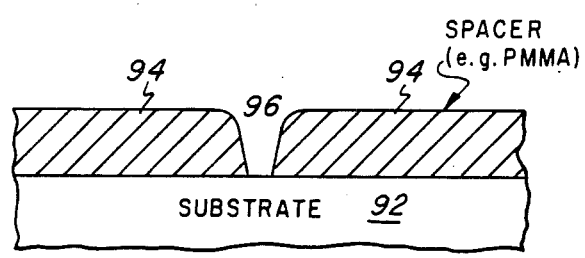
FIGS. 6A-D show the process steps for a variation of the pixel of FIG. 1.
Figure 6B:
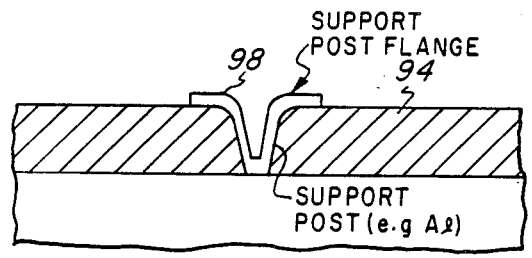
Figure 6C:
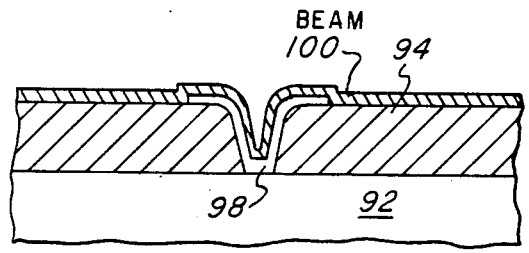
Figure 6D:
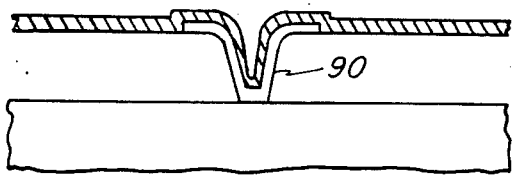

Support post 30 firmly adheres to substrate 22 (at diffusion 32) due to aluminum's wetting of the silicon surface. However, other pixel geometries are immediate and provide broader contact for the base of support post 30; for example, FIG. 5 illustrates in cross sectional view pixel 60. Pixel 60 includes p-type silicon subtrate 62, n+-type source region 64, n+-type drain 66, p+-type channel stop 68, gate oxide 70, metal gate 72, metal contact 74, support post 76, and beams 78; neighboring pixel beams 80 are indicated. Pixel 60 is fabricated by essentially the same steps as pixel 20, except for the extra steps involved in the addressing field effect transistors (source 64, drain 66, and gate 72), but the deposition of the metal for gate 72 also deposits metal contact 74 and the subsequent deposition of support post 76 then is onto metal contact 74 rather than source 64. Note that gate 72 is also the field plate.

The deposition of the metal to form flaps 28 in pixel 20 and flaps 78 in pixel 60 usually leads to the metal being compressed (both intrinsic compression at the interface with the spacer and, possibly, extrinsic compression due to the metal having a smaller coefficient of expansion than the spacer); however, the complete removal of the spacer eliminates the possibility of the metal buckling at the interface with the spacer.

Alternative supporting posts for the flaps in pixels 20 and 60 are illustrated in FIGS. 6–8. FIGS. 6A–D illustrate the following steps in fabricating support post 90: a spacer (spun-on planarizing or, if the surface of substrate 92 only contains planarized circuitry, conformal) is patterned at the locations for support posts 90; see FIG. 6A where the spacer is denoted 94 and the patterned circular hole 96. A conducting material for support post 90 is conformally deposited or evaporated over spacer 94 and patterned to define post 98; see FIG. 6B. The thickness of this deposition is chosen to adequately cover hole 96. Beam metal 100 is evaporated on and covers both spacer 94 and post 98; see FIG. 6C. The remainder of the processing is the same as that of pixel 20 and yields support post 90 and flaps shown in FIG. 6D. The two material (98 and 100) structure of support post 90 allows for a very stiff support post without a corresponding stiffness in the flaps, and improved step coverage of the support post material over the edge of the spacer hole.

Figure 7A:
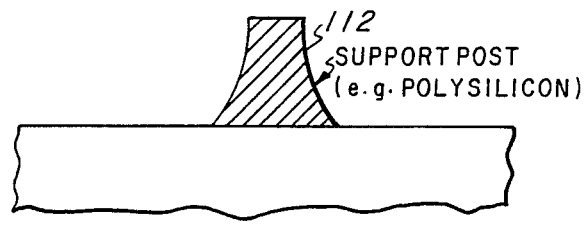
FIGS. 7A-D show the process steps for another variation of the pixel of FIG. 1.
Figure 7B:
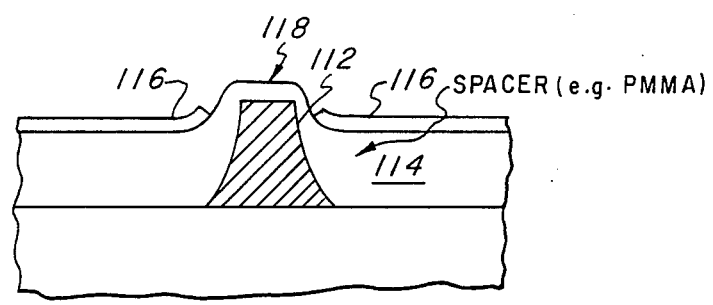
Figure 7C:
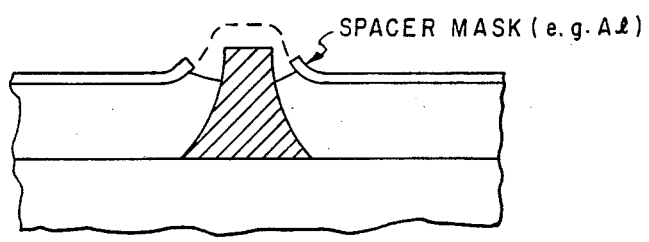
Figure 7D:
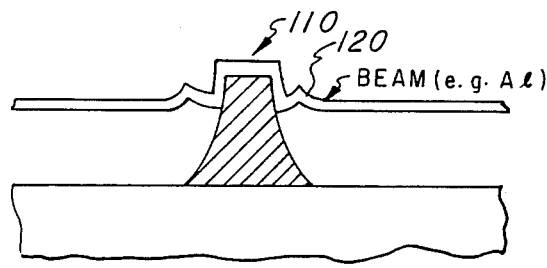

FIGS. 7A–D illustrate the fabrication steps for support post 110. In contrast to support posts 30, 76 and 90, support post 110 is defined prior to deposition of the spacer. First, a conducting material is deposited and patterned to form post 112; see FIG. 6A. The post material may be polysilicon, metal, or other conductor not etchable in the final plasma etch removing the spacer. Next, a planarizing spacer 114 is spun on to a thickness comparable to the height of post 112. The planarizing effect of the spacer material causes a reduced thickness over post 112; see FIG. 7B. A spacer mask 116 is then deposited and patterned to open hole 118 over post 112; FIG. 7B. The exposed spacer is then plasma etched until post 112 is cleared of spacer material; see FIG. 7C. Spacer mask 116 is then removed and beam material 120 evaporated on. The remainder of the steps are then the same as previously described and yield support post 110 as shown in FIG. 7D.

Figure 8B:
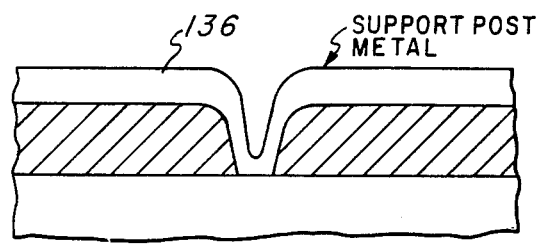
FIGS. 8A-D show the process steps of yet another variation of the pixel of FIG. 1.
Figure 8A:
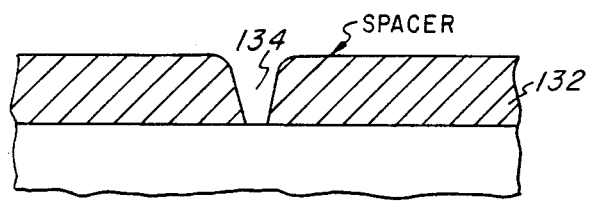
Figure 8C:
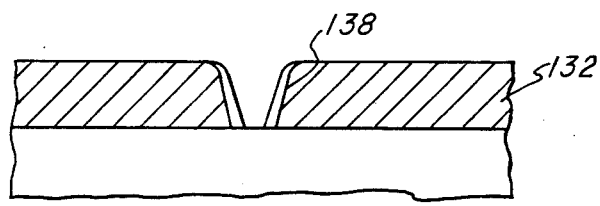
Figure 8D:
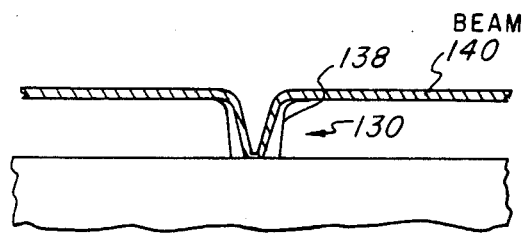

Note that support posts 90 and 110 both have large effective diameters because mask alignment tolerances require the flanges on the top of post 98 and the oversizing of hole 118. However, support post 30 requires hole 42 have sufficient taper so that the beam metal can step-cover the hole, and if hole 42 has to be etched with such a large taper that the hole diameter becomes excessively large, then support post 30 can be modified to support post 130; the fabrication steps for support post 130 are illustrated in FIGS. 8A–D. First spacer 132 is spun on and hole 134 patterned; see FIG. 8A. Next a thick layer of metal 136 is evaporated on spacer 132 and hole 134; see FIG. 8B. Metal 136 is then anisotropically etched to leave post 138 as shown in FIG. 8C; if metal 136 is aluminum, then a plasma etch in a mixture of chlorine, boron trichloride, and silicon tetrachloride can be used to achieve the required anisotropicity. Lastly, beam metal 140 is deposited and the previously described processing leads to support post 130 shown in FIG. 8D. Support post 130 is a composite of thick metal cylindrical post 138 and a layer of beam metal 140; post 138 aids both mechanically and electrically in connecting the thinner beam metal to the underlaying addressing structure.

Figure 9A:
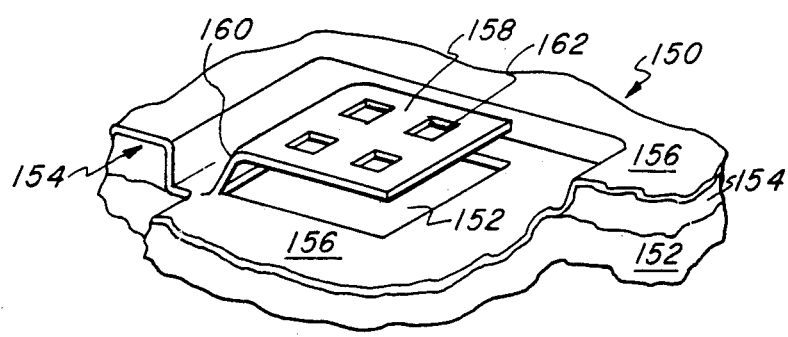
FIGS. 9A-C are schematic perspective, cross sectional and plan views of a second preferred embodiment pixel.
Figure 9B:
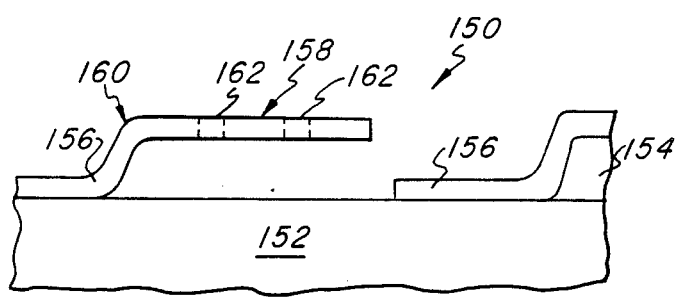
Figure 9C:
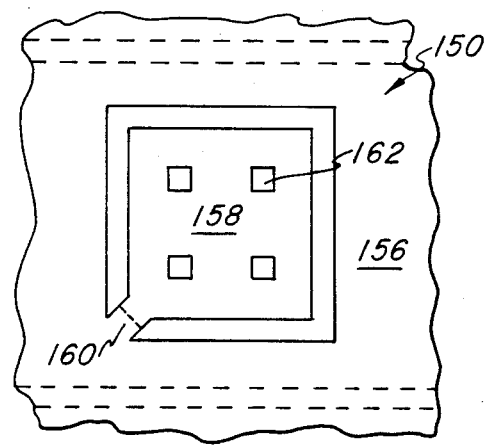
Figure 10A:
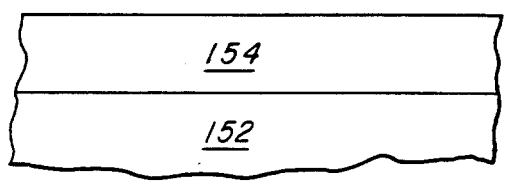
FIGS. 10A-D illustrate the process steps for fabrication of the pixel of FIG. 9.
Figure 10A:
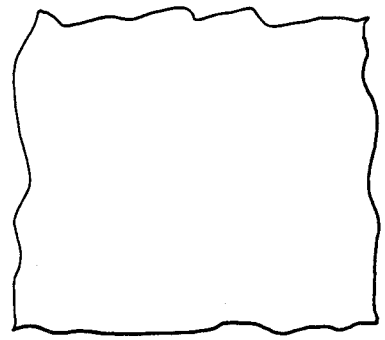
Figure 10B:
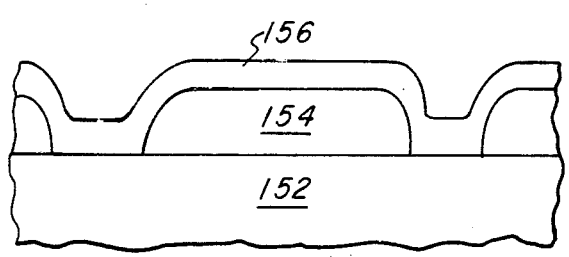
Figure 10B:
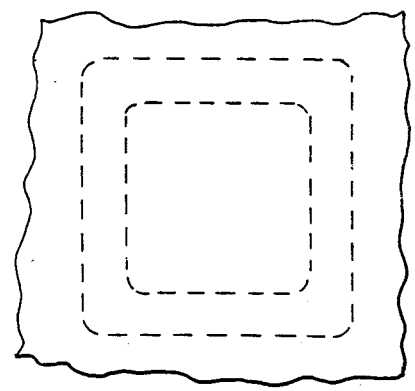
Figure 10C:
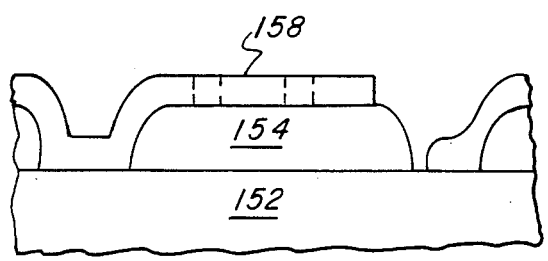
Figure 10C:
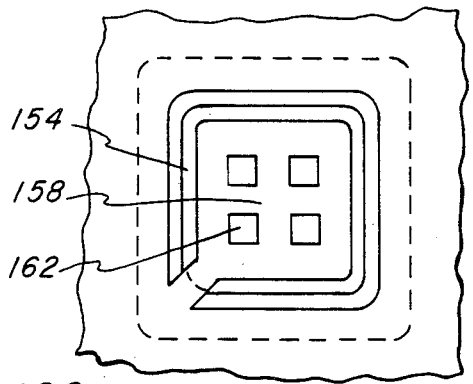
Figure 10D:
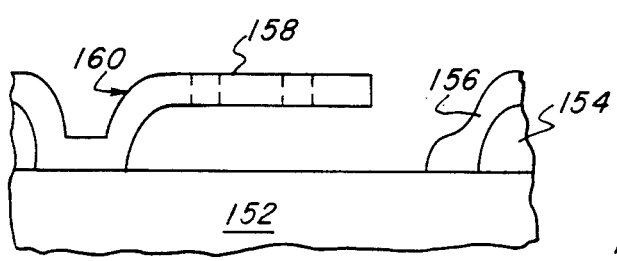
Figure 10D:
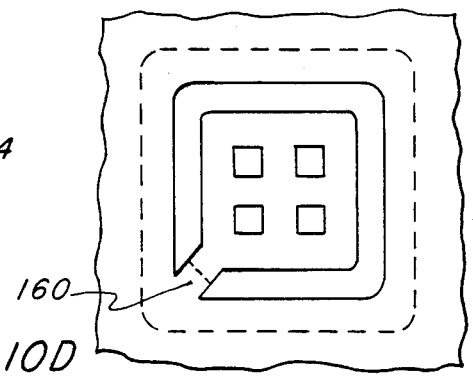

Second preferred embodiment pixel, generally denoted 150, is shown in cutaway perspective, cross sectional elevation, and plan views in FIGS. 9A–C, respectively. Pixel 150 includes substrate 152, spacer 154, and metal layer 156 in which flap 158 and hinge 160 are formed. Flap 158 has plasma etch access holes 162 which aid in the rapid removal of spacer 154 from under flap 158, as described below. The addressing circuitry for pixel 150 may be in substrate 152 below flap 158 with metal layer 156, including flap 158, held at a common voltage for all pixels in the SLM or the addressing may be by substrate 152 as the common voltage and metal layer 156 split into electrodes, one for each flap, as indicated by the dotted lines in FIG. 9C. The details of the addressing circuitry, including the insulation between metal layer 156 and substrate 152, have been omitted for clarity.

Pixel 150 may be formed with surrounding metal 156-covered spacer 154 portions, as illustrated in FIG. 9A and the right hand portion of FIG. 9B. Pixel 150 is fabricated by steps analogous to those of the fabrication of pixel 20; but the spacer in these surrounding portions is not removed in the plasma etch in oxygen because the overlying metal 156 protects it. FIGS. 10A–D show the processing steps for fabrication of pixel 150 in cross sectional elevation and plan views. First, substrate 152, together with the circuitry formed on its surface but not shown for clarity, is covered with a planarizing, spun-on spacer layer 154; note that layer 154 will have a planar surface even if circuitry on the surface on substrate 152 is not planar. Layer 154 may be positive photoresist as in the previously described processing of pixel 20 and typically 1 to 2.5 microns thick. Layer 154 is then patterned and covered with a layer of metal 156 such as by sputter deposition; see FIG. 10B. Metal layer 156 is then patterned to define the perimeter of flap 158 and plasma etch access holes 162; this patterning is a multistep, multilayer resist process due to the large step introduced by spacer 154. If metal layer 156 is an aluminum alloy, then this patterning conveniently includes a chlorine-based plasma etch; see FIG. 10C. Lastly, as with pixel 20, substrate 152 is diced into chips and then spacer 154 is removed from beneath flap 158 by an oxygen-based plasma etch; see FIG. 10D. Note that spacer 154 shown in FIG. 10D was not removed in last etch because it was protected by metal layer 156 and thus could be used as an insulator or other structural element of the SLM.

Figure 11A:
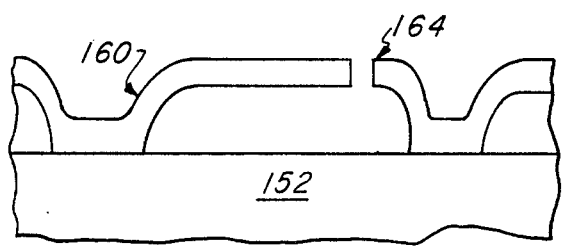
FIGS. 11 and 12 show variations of the pixel of FIG. 9.
Figure 11A:
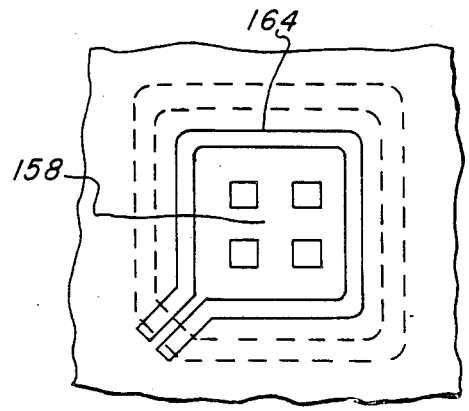
Figure 11B:
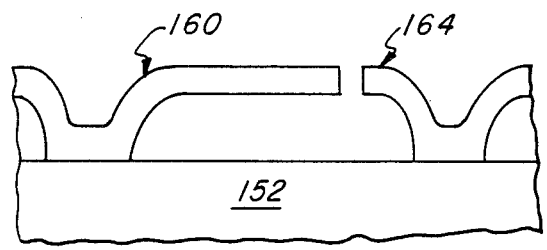
Figure 11B:
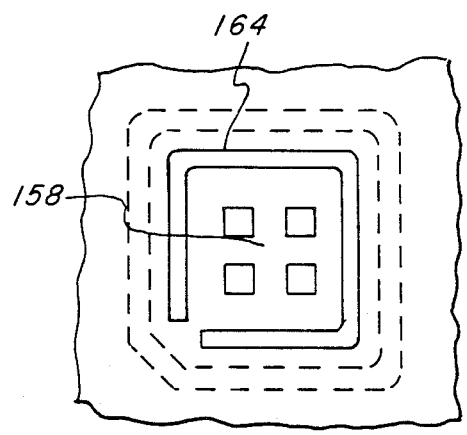
Figure 11C:
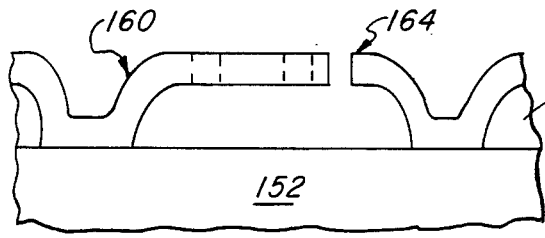
Figure 11C:
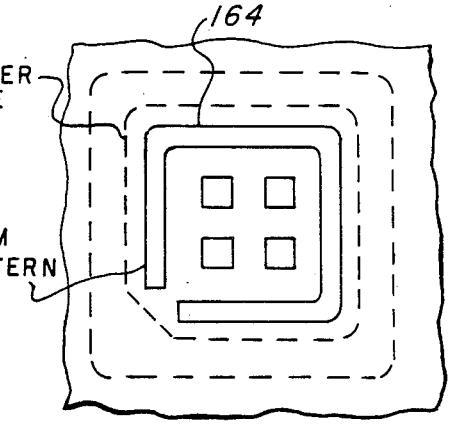

Some alternative geometries for pixel 150 are illustrated in FIGS. 11A–C and show patterning for flap 158 on the flat portion of patterned spacer 154 rather than on the step as with pixel 150. Such patterning leads to edges 164 of metal which are not adhering to substrate 152 and can buckle if metal 156 is deposited in a compressed state (both intrinsic compression due to the non-epitaxial nature of the deposition and extrinsic compression due to the difference in the thermal coefficients of expansion of metal 156 and spacer 154 coupled with the elevated temperature of the deposition. However, flap 158 does not buckle because it is only constrained at hinge 160 which has too small an extent to support the lowest mode buckle. Further, hinge 160 itself adheres to substrate 152, and therefore is not free to buckle, so flap 158 remains flat and parallel to substrate 152.

Figure 12:
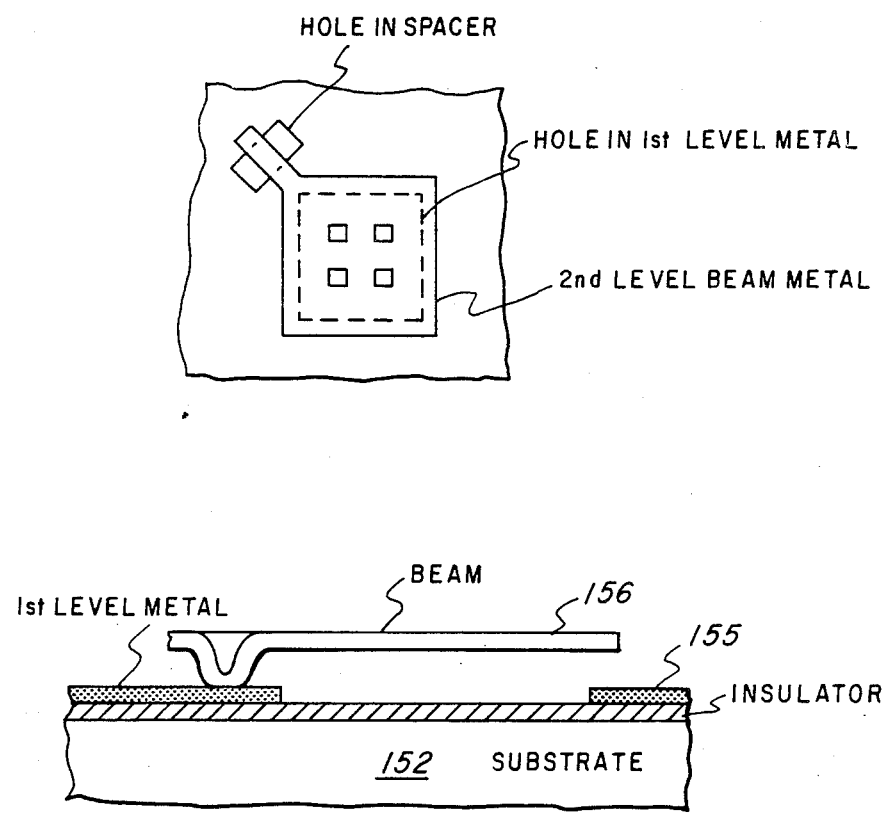

Another variation of pixel 150 is shown in FIG. 12 and includes two levels of metal and insulation on substrate 152. A first level of metal 155 is patterned with a hole corresponding to the region where the flap will be formed (dotted lines in the plan view); next a planarizing spacer 154 is spun on and a hinge hole patterned in it; then, metal 156 is deposited on spacer 154 and patterned to define flap 158; and lastly, spacer 154 is removed. This variation of pixel 150 is quite similar to pixel 20 in that all of spacer 154 is removed.

Pixels 20, 60, and 150 all have corner hinges and thus bend along a line that is rotated 45 degrees with respect to the axes formed by the perimeters of the flaps. With this geometry, 45 degree schlieren stop 45 degree dark field discrimination can be used to produce a high contrast projected image of the deflected flap. In this discrimination technique an optical stop is designed which blocks all of the on-axis diffracted light from the flap perimeter openings and surrounding covered spacer portions, if any, but passes the of-axis light from the 45 degree flap deflection. Plasma etch access holes and hinges diffract light nearly isotropically, so some of this light passes around a schlieren stop; but the resultant degradation is negligible because the holes and hinges diffract only a small portion of the total light impinging on each pixel.

Figure 13A:
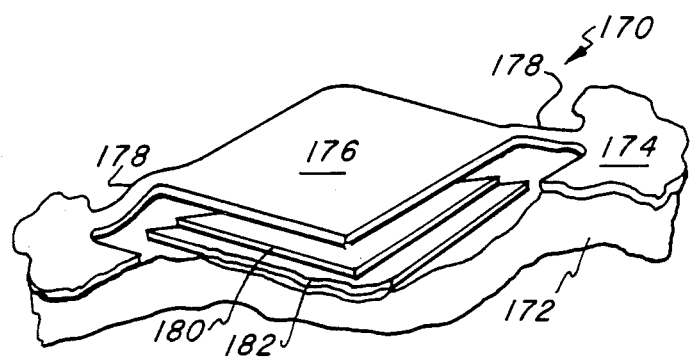
FIG. 13 shows third preferred embodiment pixel.
Figure 13B:
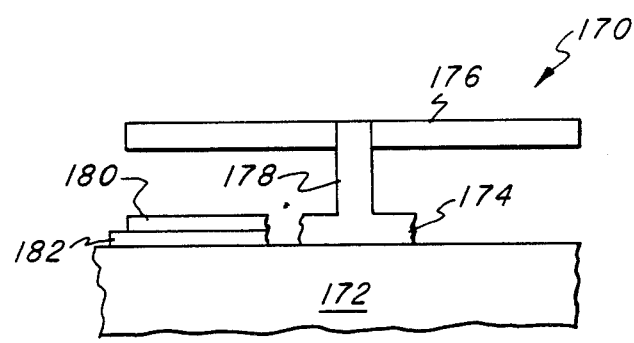
Figure 13C:
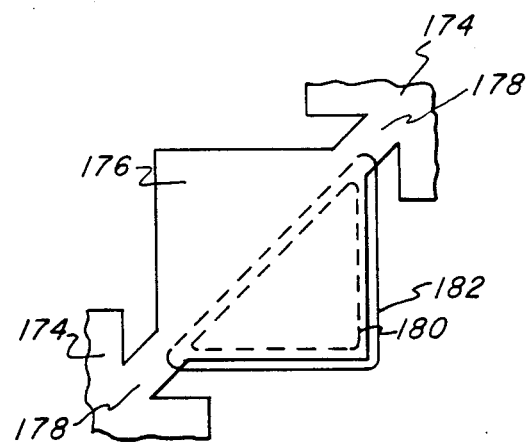

Third preferred embodiment pixel, generally denoted 170, is shown in cutaway perspective, cross sectional elevation, and plan views in FIGS. 13A–C, respectively. Pixel 170 includes substrate 172, metal layer 174 incorporating flap 176 and hinges 178, and addressing electrode 180 which is isolated from substrate 172 by insulating layer 182. Pixel 170 is fabricated by process steps similar to those perviously described in connection with pixels 20 and 150. Pixel 170 operates by twisting flap 176 along the axis through hinges 178; the twisting torque arises from a signal applied to electrode 180 which only attracts the left hand portion of flap 176 as viewed in FIG. 13B. That is, FIG. 13B is a view along the twist axis, and the torque developed by a signal causes rotation counterclockwise. Note that compression of the metal of flap 176 arising from the deposition is relieved by hinges 178 bending and maintaining flap 176 parallel to substrate 172.

Figure 14A:
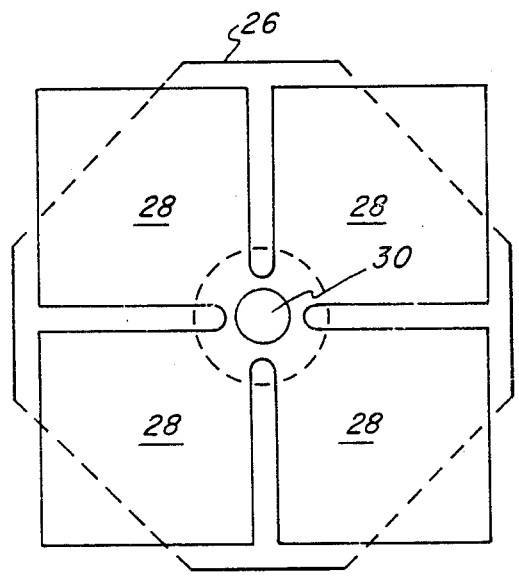
FIG. 14 illustrates a variation applicable to all of the foregoing pixels.
Figure 14B:
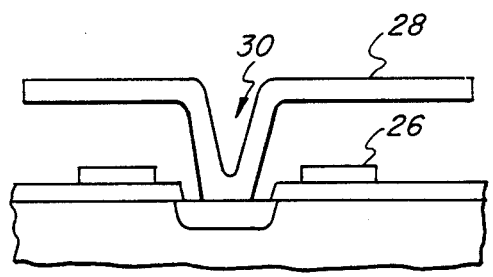

FIGS. 14A–B illustrate a modification of the field plate of pixel 20 which is also applicable to pixels 60, 150, and 170 and allows for greater deflection angles of the flaps for a given spacer thickness (i.e., distance from the flap to the field plate) as follows. A simple model of the electrostatic and restoring forces on a corner hinged flap indicates that once the signal voltage is large enough to deflect the tip of the flap farthest from the hinge 51% of the distance to the field plate, then any further voltage increase makes the flap unstable and it collapses to the field plate. Recall the discussion in connection with FIG. 3 where this maximum stable flap voltage was called the collapse voltage. The same simple model indicates that if the electrostatic force only applies over the half of the flap closest to the hinge, then the tip of the flap can stably be deflected 83% of the distance to the field plate. (Of course, the collapse voltage for this half active flap is higher than the collapse voltage for the fully active flap.) Thus by removing the portion of the field plate 26 under the tip, as indicated in FIGS. 14A–B, then flap 28 is only partially active and permits a greater stable deflection. Also, this permits thinner spacers for the same collapse voltage.

Variations of the foregoing with respect to dimensions, materials, architecture, and so forth are immediate.

What is claimed is:

1. A method of fabricating a spatial light modulator with deflectable beams, comprising the steps of:
   (a) apply a spacer on a substrate including electronic addressing circuitry;
   (b) pattern said spacer to define post holes extending down to said subtrate;
   (c) deposit a layer of metal on said spacer and post holes;
   (d) define defectable beams in said metal so that each beam is hinged to the metal in one of said post holes;
   (e) remove said spacer.

2. The method of claim 1 wherein said removal is by a plasma etch.

3. A method of fabricating a spatial light modulator with deflectable beams, comprising the steps of:
   (a) spin a spacer onto a substrate including electronic addressing circuitry;
   (b) pattern said spacer to define post holes extending down to said substrate;
   (c) deposit metal on said spacer and post holes;
   (d) remove said metal from said spacer except in the vicinity of said post holes;
   (e) apply a second layer of metal on said spacer and metallized post holes;
   (f) define deflectable beams in said second metal layer;
   (g) remove said spacer.

4. A spatial light modulator, comprising:
   (a) a plurality of pixels on a substrate with electronic addressing circuitry;
   (b) each of said pixels including (i) an electrostatically deflectable reflecting element, (ii) a support holding said element spaced away from said substrate, and (iii) said element and support both electrical conductors and electrically connected, and said support connected electrically connected to said addressing circuitry.

5. A spatial light modulator, comprising:
   (a) a plurality of pixels on a substrate with electronic addressing circuitry;
   (b) each of said pixels including a single piece of metal with a support portion attached to said substrate, a hinge portion connected to said support portion, and a deflectable portion connected to said hinge portion and held spaced away from said substrate;
   (c) said support portion electrically connected to said addressing circuitry and said deflectable portion over an electrode connected to said addressing circuitry.

6. The spatial light modulator of claim 5, wherein:
   (a) said single piece of metal is in the shape of four square flaps, with each flap connected at a corner to a central post.

7. The spatial light modulator of claim 5, wherein:
   (a) said electrode only extends beneath the portion of said deflectable portion near said support.

8. A spatial light modulator, comprising:
   (a) a plurality of pixels on a substrate with electronic addressing circuitry;
   (b) each of said pixels including a post and hinged electrically conductive flaps;
   (c) said post including a first electrically conducting portion attached to said substrate and circuitry and an overlying metal portion contiguous with said hinged flaps.

* * * * *